April 17, 1928.　　　　　　　D. GENTILE　　　　　　　1,666,492
AUTOMOTIVE APPLIANCE
Filed April 19, 1927　　　2 Sheets-Sheet 2

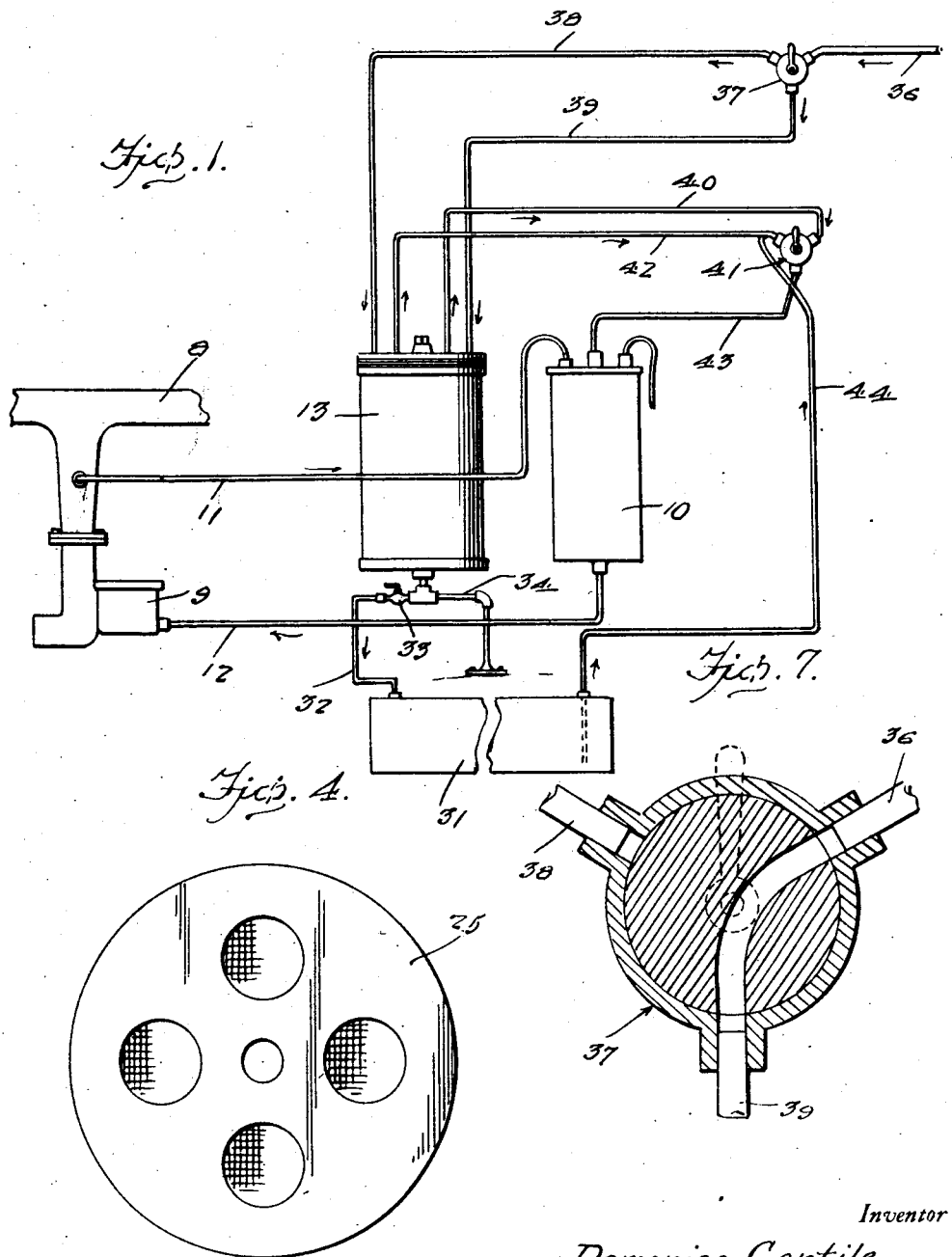

Inventor
Domenico Gentile

By *Clarence A. O'Brien*
Attorney

Patented Apr. 17, 1928.

1,666,492

UNITED STATES PATENT OFFICE.

DOMENICO GENTILE, OF ROME, NEW YORK.

AUTOMOTIVE APPLIANCE.

Application filed April 19, 1927. Serial No. 185,036.

This invention has reference to an improved automotive appliance for installation in the fuel supply line between the main supply tank and the customary vacuum tank.

One aim is to provide a means whereby the fuel is conducted to the vacuum tank through the medium of individual branch pipes connected to the supply pipe at one end and in communication with the vacuum tank at an opposite end, a control valve being provided so that in the event one branch pipe becomes clogged, the other branch pipe can be brought promptly into use in order that the fuel can be conveyed to the carbureter in a dependable manner.

A second and equally important purpose is to provide a novel filtering device for the fuel so that it will be thoroughly strained before entering the vacuum tank.

A third purpose is to provide a structure of this character which includes one or more reserve reservoirs or receptacles from which a fuel can be drawn into the vacuum tank after the latter and the main supply tank have exhausted their supply.

Then too, I propose a multiple valved pipe connection between the filtering device and vacuum tank in order to permit the fuel to be drawn into the vacuum tank in a normal way or under emergency conditions if the main source of fuel becomes accidentally exhausted.

Other purposes and advantages will become more readily apparent from the following description and drawings.

In the drawings:—

Figure 1 is a diagrammatic view showing the general arrangement and organization of parts.

Figure 4 is a top plan view of one of the details.

Figure 7 is an enlarged sectional view of a two-way control valve.

Figure 3:
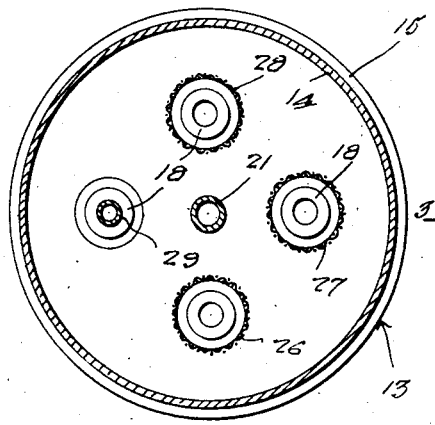
Figure 3 is a horizontal section taken on the line 3—3 of Figure 2 looking in the direction of the arrow.

Considering now the drawings in detail, it will be seen that the reference character 8 designates generally the customary intake manifold, 9 represents the carbureter, 10 the ordinary vacuum tank, 11 the suction line between the vacuum tank and intake manifold, and 12 the fuel conducting pipe from the bottom of the vacuum tank to the carburetor. The details are of ordinary construction and arrangement.

Figure 2:
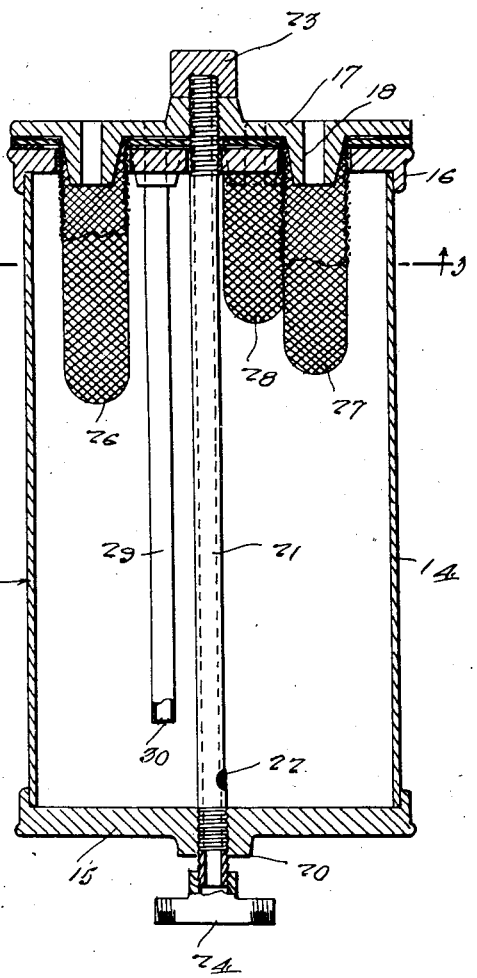
Figure 2 is an enlarged view in section of the improved filtering device.

The improvement comprises first a filtering device designated generally by the reference character 13. This is better shown in Figure 2 and the succeeding detail views. Referring to Figure 2 it will be noted that it comprises an open ended cylinder 14 of glass or metal. This cylinder is seated in a cup-shaped bottom 15. A special closure is provided for its top. The closure comprises a plate 16 having a marginal flange fitted over the cylinder. This plate is provided with a threaded central opening and four equi-distant holes of larger diameter.

Figure 5:
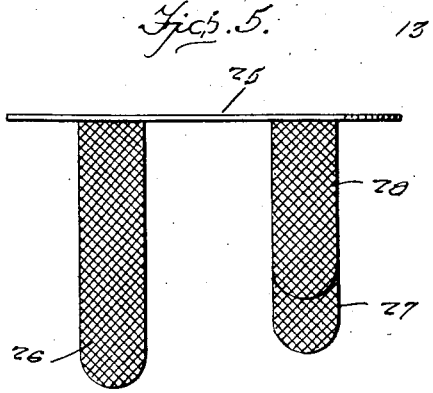
Figure 5 is a side elevation of the same.
Figure 6:
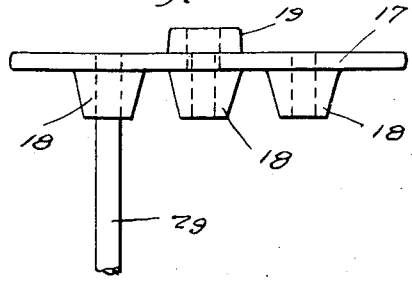
Figure 6 is also a side elevation of another one of the details of the filtering device.

The next part 17 is in the form of a disk, which as shown in Figure 6 is provided on its under side with four depending nipples 18 which extend down through the openings in the plate 16. Also this is provided at its center with an upstanding boss 19. In this connection it will be noted that the bottom plate 15 is provided with a threaded boss 20. Cooperating with these bosses is a centrally located tube 21 threaded at both ends through the cylinder and through and beyond the bosses. This tube is provided in the filtering device near the bottom thereof with a hole covered by a screen 22 (see Figure 2). A threaded closing cap 23 is connected with the upper end, while a T-shaped coupling 24 is connected with the lower end. Interposed between the plates 16 and 17 is a relatively thin plate 25 carrying three depending strainers 26, 27 and 28 (see Figure 5). On opposite sides of this plate 25 are suitable packing elements. When in place, the strainers 26, 27 and 28 extend downwardly through the holes in the plate 16 and the nipples 18 depend into the upper ends of the strainer as shown in Figure 2. Three of these nipples are located in this manner, while the remaining nipple carries a reserve fuel conducting pipe 29 having its lower end located in close proximity to the bottom plate 15 and provided with a screen 30.

The receptacle formed by the cylinder 14, the bottom plate 15 and the closure at the top of the cylinder provides a reserve supply receptacle, and for convenience will be hereinafter designated as the primary reserve receptacle. This is because of the fact.

as shown in Figure 1, a supplementary reserve receptacle 31 is also provided. This comprises a horizontal container of appropriate dimensions which is connected with the drain coupling 24 at the bottom of the main receptacle through the medium of a pipe 32. A valve 33 is provided here so that fuel can be drained from the main receptacle 13 to pass through the pipe 32 and into the supplemental or secondary receptacle 31. Here, I might mention that the reference character 34 designates a supporting bracket to be attached to a stationary part of the vehicle. The part 34 is of course of solid formation.

Attention is now directed to Figure 1 again wherein it will be noted that the reference character 36 designates the main supply pipe leading from the gasoline tank (not shown). This is connected by way of a two-way valve 37 with branch pipes 38 and 39, respectively. The branch pipes connect at their lower ends with the nipples 18 leading into the screen or strainers 26 and 27, respectively. With this arrangement it will be seen that by proper manipulation of the valve 37 the gasoline can be conducted either through the pipe 38 or 39 as conditions require. The filtered gasoline is drawn from the receptacle 13 by way of a pipe 40 which leads to another two-way valve 41. Also leading to this valve is a reserve fuel conducting pipe 42. The pipe 42 is connected with the aforesaid pipe 29 in Figure 2, while the pipe 40 is connected with the short strainer 28. In addition, the vacuum tank pipe 43 connects with this valve 41 as well pipe 44 which connects the secondary or reserve receptacle 31. If car is equipped with a receptacle as 31, pipe 42 is removed and opening to pipe 29 plugged and pipe 44 connected to valve 41 at point where pipe 42 connects. Lower end of pipe 44 is connected to a hollow pipe of same construction as pipe 29 reaching nearly to bottom of receptacle 31. A pet-cock for draining is attached to bottom of receptacle 31.

The operation of the appliance or apparatus is as follows:

To begin with, the gasoline comes from the supply tank, (not shown), through the supply pipe 36 into the primary receptacle 13. By way of the valve it may be caused to pass through the pipe 38 into the receptacle or through the pipe 39 according to the position of the valve, (see Figure 7). The purpose of this arrangement is, as before stated, to provide a dual pipe arrangement, whereby in case of pipe 38 for instance should become clogged, the gasoline can then be shunted through the pipe 39. Frequently, the engine will stop because of the improper flow of the fuel from the source of supply. By this arrangement however, the operator has a more dependable method of checking up on the supply of fuel. In other words, if the cause of the trouble seems to be from an improper supply of the fuel which has previously passed through the pipe 38, it is an easy matter to close this pipe off and to bring the pipe 39 into play. Then if the engine operates properly it is obvious that the cause of the trouble was a clogged line. As before indicated the fuel is sucked out of the receptacle 13 into the vacuum tank by way of the pipe 40, the valve 41, and the pipe 43. Incidentally the valve 41 must be normally arranged to permit this line of communication. Moreover, the gasoline in the receptacle must be of a height to dispose the strainer 28 down in the body of gasoline in the receptacle so that the suction will operate properly. The remainder of the course of the fuel is clearly apparent.

In the event that the main supply tank and vaccum tank have been accidentally drained of fuel, the valve 41 is turned so that an emergency supply can be drawn into the vacuum tank by way of the emergency pipe 42. As before stated, this is connected with the pipe 29 in Figure 2.

I may mention that the tube 21 in Figure 2 constitutes a means for filling the receptacle 13 with gasoline when the cap 23 is removed. This means of filling however is not altogether essential, because the vacuum from the vacuum tank can be utilized for filling this receptacle. In addition, fuel can be drawn from the receptacle 13 into the secondary receptacle 31, this when the valve 33 is open.

The construction and arrangement of parts as well as the operation and advantages will doubtless be clear after considering the description in connection with the drawings, therefore a more lengthy description is deemed unnecessary.

While the preferred embodiment of the invention has been shown and described it is to be understood that minor changes coming within the field of invention claimed may be resorted to if desired.

Having thus described the invention what I claim as new and desire to secure by Letters Patent is:—

1. In a structure of the class described, in combination, a fuel supply pipe, a vacuum tank, individual branch pipes in communication with said vacuum tank, and a control valve interposed between the supply pipe and said branch pipes and constructed and arranged to connect the branch pipes alternately with the supply pipe, whereby the fuel can be selectively conducted through either one or the other of the individual branch pipes, together with a filtering device, said branch pipes being connected with said filtering device, and said filtering device being in communication with said vacuum tank through a pair of pipes leading from the filtering device, a single pipe leading to the vacuum tank, and a valve constructed and arranged for connecting the pipes of the pair alternately with the single pipe.

2. In a structure of the class described, in combination, a reserve receptacle, a supply pipe connected therewith, a multiple valve connected with said receptacle, a vacuum tank, a single pipe leading from said valve to said vacuum tank, a filtering device, and a pair of pipes leading from said filtering device to said valve; the said valve being constructed and arranged to alternately connect the pipes of the pair with the other pipes.

3. In a structure of the class described, in combination, a filtering device, a main fuel supply pipe, branch pipes connected with said filtering device, a valve for connecting the supply pipe with said branch pipes alternately, a vacuum tank, a control valve, a pipe leading from said control valve to said vacuum tank, individual branch pipes leading from said filtering device to said valve; the valve being constructed to connect the branch pipes alternately to the vacuum tank pipe.

4. In a structure of the class described, in combination, a filtering and reserve supply device, a main fuel supply pipe, branch pipes connected with said supply pipe and said filtering device, said connection effected by a valve for connecting the branch pipes alternately with the supply pipe, a vacuum tank, a control valve, a pipe leading from said control valve to said vacuum tank, individual and additional pipes leading from said filtering device to said valve, the control valve being constructed to connect the last named pipes alternately to the pipe leading to the vacuum tank, a valved drain at the bottom of said filtering device, a secondary reserve receptacle, a connection between said valved drain and said secondary receptacle, and a pipe leading from said secondary receptacle to said control valve.

In testimony whereof I affix my signature.

DOMENICO GENTILE.